(12) United States Patent
Wozniac et al.

(10) Patent No.: US 10,165,437 B2
(45) Date of Patent: Dec. 25, 2018

(54) EMBEDDED SUBSCRIBER IDENTITY MODULE CAPABLE OF MANAGING COMMUNICATION PROFILES

(71) Applicant: IDEMIA FRANCE, Colombes (FR)

(72) Inventors: Thomas Wozniac, Colombes (FR); Guillaume Larignon, Colombes (FR)

(73) Assignee: IDEMIA FRANCE, Colombes (FR)

( * ) Notice: Subject to any disclaimer, the term of this patent is extended or adjusted under 35 U.S.C. 154(b) by 0 days.

(21) Appl. No.: 15/125,397

(22) PCT Filed: Mar. 9, 2015

(86) PCT No.: PCT/FR2015/050573
§ 371 (c)(1),
(2) Date: Oct. 14, 2016

(87) PCT Pub. No.: WO2015/136200
PCT Pub. Date: Sep. 17, 2015

(65) Prior Publication Data
US 2017/0215063 A1    Jul. 27, 2017

(30) Foreign Application Priority Data
Mar. 14, 2014 (FR) .................................... 14 52152

(51) Int. Cl.
*H04W 8/18* (2009.01)
*H04B 1/3816* (2015.01)
(Continued)

(52) U.S. Cl.
CPC .......... *H04W 8/183* (2013.01); *H04B 1/3816* (2013.01); *H04L 67/303* (2013.01); *H04W 8/04* (2013.01)

(58) Field of Classification Search
CPC ............................ H04W 8/183; H04W 12/08
(Continued)

(56) References Cited

U.S. PATENT DOCUMENTS 9,674,690 B2 * 6/2017 Lee ....................... H04W 8/183

FOREIGN PATENT DOCUMENTS

WO    2011/036484 A2    3/2011

OTHER PUBLICATIONS

PCT International Search Report dated May 29, 2015, International Applicaton PCT/FR2015/050573, pp. 1-5 (including English Translation).

(Continued)

*Primary Examiner* — Lee Nguyen
(74) *Attorney, Agent, or Firm* — MH2 Technology Law Group, LLP

(57) ABSTRACT

Devices, systems, and methods related to an embedded subscriber identity module (eUICC) suitable for co-operating with a communication device (T) are described. The module may include a communication profile (P1) configured to enable the embedded subscriber identity module to communicate with a telecommunications network (R) when the profile (P1) is active; a reception module (PSM) for receiving, from a remote server (SM-SR) of the mobile telephone network (R), a communication profile management request; and a profile manager module (MGP). The profile manager module may be configured such as, on receiving the management request, to determine whether a rule from a predefined set of at least one rule (RL) is applicable; and if so, to execute an action specified by the applicable rule in association with a communication profile of the embedded subscriber identity module.

15 Claims, 4 Drawing Sheets

(51) Int. Cl.
*H04L 29/08* (2006.01)
*H04W 8/04* (2009.01)
*H04W 8/20* (2009.01)

(58) Field of Classification Search
USPC .................................................. 455/410–411
See application file for complete search history.

(56) References Cited

OTHER PUBLICATIONS

"Reprogrammable SIMs: Technology Evolution and Implications. Final Report", prepared by the CSMG Company, Sep. 25, 2012, Retrieved from the Internet: http://stakeholders.ofcom.org.uk/binaries/research/telecoms-research/reprogrammable-sims.pdf, pp. 1-95.

\* cited by examiner

EMBEDDED SUBSCRIBER IDENTITY MODULE CAPABLE OF MANAGING COMMUNICATION PROFILES

CROSS-REFERENCE TO RELATED APPLICATIONS

This application is a U.S. National Stage application of International Application No. PCT/FR2015/050573 filed 9 Mar. 2015, which claims priority to French Application No. 1452152 filed 14 Mar. 2014, the entire disclosures of which are hereby incorporated by reference in their entireties.

BACKGROUND OF THE INVENTION

The present invention relates to an embedded subscriber identity module (SIM) also known as an embedded universal integrated circuit chip (eUICC), and it relates more particularly to an eUICC card suitable for performing appropriate processing relating to a communication profile, such as an operation to activate or deactivate a profile, for example.

In known manner, a SIM card is configured to enable a communication device (such as a mobile telephone, for example) with which it co-operates to make use of the communication network of a single network operator. To do this, the SIM card includes in particular a unique identifier known as an international mobile subscriber identity (IMSI) that is associated with a particular subscription of a user with a given mobile network operator.

When a mobile telephone seeks to use the services of a communication network, it sends the IMSI identifier of its SIM card to the network in order to identify itself with the network. In order to authenticate itself with the network, the mobile telephone also sends a secret key that is contained in the SIM card. The operator users a database known as a home location register (HLR) to verify that the user has indeed subscribed to the requested service, and if so, authorizes the mobile telephone in question to access the service.

Conventionally, subscription data (identifiers, keys, algorithms, . . . ) specific to the operator that issued the SIM card are stored in permanent manner in a read only memory (ROM) of the SIM card so that the SIM card is not reprogrammable. This serves in particular to reduce the risk of fraud relating to the identity of the user by making it more difficult to modify or duplicate the SIM card or its subscription data.

Consequently, the only way that a user can change mobile network operator is generally by manually replacing a current SIM card in the mobile telephone with a new SIM card issued by a new operator selected by the user. The new SIM card contains the subscription data necessary for accessing the network and the services belonging to the new operator.

The emergence of reprogrammable SIM cards, and in particular of embedded subscriber identity modules (also known as eUICC cards, as mentioned above), enables a user to change operator without it being necessary to physically replace the SIM card in the mobile telephone. The main characteristics of an eUICC card are defined in the document entitled "Reprogrammable SIMS: technology, evolution, and implications—final report" dated Sep. 25, 2012 (by CSMG). That document drawn up for the global system for mobile communications association (GSMA) defines an eUICC card as a small trusted hardware component, which may be soldered into mobile devices in order to perform the functions of a traditional SIM card.

In particular, an eUICC card is suitable for containing a communication profile that, when active, enables the mobile telephone to have secure access to the network of an operator and to the services defined by the profile in question. By changing the communication profile that is active in the eUICC card, it is also possible to change operator or to modify access to associated services (e.g. voice or data services).

The use of an eUICC card is advantageous in particular when it is difficult to replace a traditional SIM card physically and, more generally, when it is desired to be able to switch easily from one operator to another.

Nevertheless, the specification and the standardization concerning the operation and the hardware of an eUICC card are still under development and call for improvements. In particular, there does not exist at present any satisfactory solution for managing the activation or the deactivation of a communication profile in an eUICC card. More generally, there exists a need for a solution that enables an eUICC card to manage communication profiles effectively.

OBJECT AND SUMMARY OF THE INVENTION

To this end, the present invention relates to an embedded subscriber identity module suitable for co-operating with a communication device, the embedded subscriber identity module comprising:
at least one communication profile configured to enable the embedded subscriber identity module to communicate via the communication device with a mobile telephone network when said communication network is active;
a reception module suitable for receiving, from a remote server of the mobile telephone network, a communication profile management request; and
a profile manager module configured:
on receiving said management request, to determine whether at least one rule from a predefined set of at least one rule contained in memory in said embedded subscriber identity module is applicable; and
if so, to execute at least one action specified by said applicable rule in association with a communication profile of said embedded subscriber identity module.

The present invention makes it possible to optimize the management of communication profiles in a secure component such as an embedded subscriber identity module by using a set of at least one rule that can be applied by the profile management module. The present invention provides great flexibility in managing communication profiles as a function of events detected by the secure component, in particular such as requests received from mobile telephone operators. The invention makes it possible to trigger predefined actions that are appropriate to each received management request, such as for example activating or deactivating a profile, creating or deleting a profile, or indeed switching over from a first profile to a second profile.

In a particular embodiment, the profile manager module is suitable for consulting the predefined set of at least one rule in order to determine which of the rules is/are applicable in response to the communication profile management request. The profile manager module is capable of processing the received management request appropriately by executing one or more actions specified by the applicable rules in the predefined set.

In a particular embodiment, each communication profile is contained in a dedicated secure domain of the embedded subscriber identity module.

In a particular embodiment, said at least one action specified by said applicable rule comprises at least one of the following:

triggering a changeover from said active communication profile to a determined second communication profile;

triggering deactivation of said active communication profile;

triggering activation of a second communication profile;

deleting some or all of the data of said active communication profile, said data being stored in a non-volatile memory of said subscriber identity module;

triggering deactivation of at least one function of said active communication profile;

triggering a timer in order to impose a determined waiting time delay between receiving said request to manage said profile and performing at least part of said at least one action; and notifying a remote server of the performance of an action, e.g. an action of loading, activating, deactivating, or deleting a communication profile, or some or all of the data of a communication profile.

In particular, informing the remote server in advance of the performance of a forthcoming particular action (activating deactivating, profile switching, etc.) associated with a communication profile is advantageous specifically in that it enables the corresponding mobile network operator to act at an opportune moment to trigger the necessary management operations that relate to the profiles in question (e.g. triggering deletion of sensitive information (cryptographic keys, algorithms, etc.) contained in a profile that is about to be deactivated, prior to actual deactivation of the profile P1).

By way of example, said at least one above-mentioned function comprises at least one of a contactless payment application and a transport ticket application.

In a particular embodiment, the profile manager module is configured to consult a database of communication profiles, said database being stored in a rewritable non-volatile memory of the embedded subscriber identity module, in order to obtain at least one item of additional data enabling said at least one specified action to be performed.

In a particular embodiment, said database of profiles comprises, in association with each profile, at least one of the following: an identifier of a communication profile; a status indicating whether said communication profile is active or not active; a pointer to the memory address of said profile; and an address of the server of the provider of said profile.

In a particular embodiment, the management request requests deactivating the active communication profile, and the profile manager module is configured:

to determine, from said database of communications profiles, an address of said remote server of the telephone network associated with the active communication profile; and to trigger sending of a notification to said remote server by using said address in order to inform the remote server of the forthcoming loading, activation, deactivation, or deletion of a communication profile or of some or all of the data of a communication profile.

In a particular embodiment, the profile manager module is configured to use the database of profiles to determine a notification application;

the profile manager module being configured to send a command containing said address to the notification application in order to cause said notification application to send the notification to said remote server.

In a particular embodiment, the notification (e.g. deactivation) is sent to the remote server by using a message of the short message service (SMS) type or of the unstructured supplementary service data (USSD) type, or by using a message based on the hypertext transfer, card application toolkit transfer protocol (HTTPs/CAT TP) or on the bearer independent protocol (BIP).

In a particular embodiment, the remote server is an SM-SR server of the telephone network.

In a particular embodiment, the communication device is a mobile telephone terminal. Alternatively, the communication device is a communicating intelligent object for "machine-to-machine" communication. By way of example, a communicating intelligent object is a communicating meter that identifies the energy consumption of a building and transmits it automatically to a distributor via a telecommunications network.

The present invention also provides a system comprising a communication device and an embedded subscriber identity module as defined above, wherein the embedded subscriber identity module is suitable for co-operating with the communication device to communicate with the communication network, the communication device being a mobile telephone terminal, for example.

Correspondingly, the invention provides a method of managing a communication profile, the method being performed by an embedded subscriber identity module suitable for co-operating with a communication device, the method comprising:

using a communication profile contained in the embedded subscriber identity module to communicate via the communication device with a mobile telephone network when said communication profile is active;

receiving a communication profile management request from a remote server of the mobile telephone network;

on receiving the management request, using a profile manager module to determine whether at least one rule from a predefined set of at least one rule contained in memory in the embedded subscriber identity module is applicable; and if so, using the profile manager module to execute at least one action specified by said applicable rule in association with a communication profile of the embedded subscriber identity module.

In a particular embodiment, each communication profile is contained in a dedicated secure domain of said embedded subscriber identity module.

In a particular embodiment, the various steps of the method of managing a communication profile are determined by computer program instructions.

Consequently, the invention also provides a computer program on a data medium (or recording medium), the program being suitable for being performed in a trusted component such as an embedded subscriber identity module or more generally by a processor, the program including instructions adapted to performing steps of a method of managing a communication profile as described above.

The program may any programming language and may be in the form of source code, object code, or code intermediate between source code and object code, such as in a partially compiled form, or in any other desirable form.

The invention also provides a computer-readable data medium (or recording medium) including instructions of a computer program as mentioned above.

The data medium may be any entity or device capable of storing the program. For example, the medium may comprise storage means, such as a read only memory (ROM), e.g. a compact disk (CD) ROM, or a microelectronic circuit ROM, or it may comprise magnetic recording means, e.g. a floppy disk or a hard disk.

Furthermore, the data medium may be a transmissible medium such as an electrical or optical signal, that can be conveyed via an electrical or optical cable, by radio, or by other means. The program of the invention may in particular be downloaded from an Internet type network.

Alternatively, the data medium may be an integrated circuit in which the program is incorporated, the circuit being adapted to execute or to be used in the execution of the method in question.

BRIEF DESCRIPTION OF THE DRAWINGS

Other characteristics and advantages of the present invention appear from the following description made with reference to the accompanying drawings, which show an embodiment having no limiting character. In the figures.

DETAILED DESCRIPTION OF EMBODIMENTS

The present invention relates to an embedded subscriber identity module, and it relates more particularly to an eUICC card suitable for acting appropriately to perform processing on a communication profile, such as a profile activation or deactivation operation, for example.

As mentioned above, in the present document, an embedded subscriber identifier module is referred to more simply as an "eUICC card".

Figure 1:
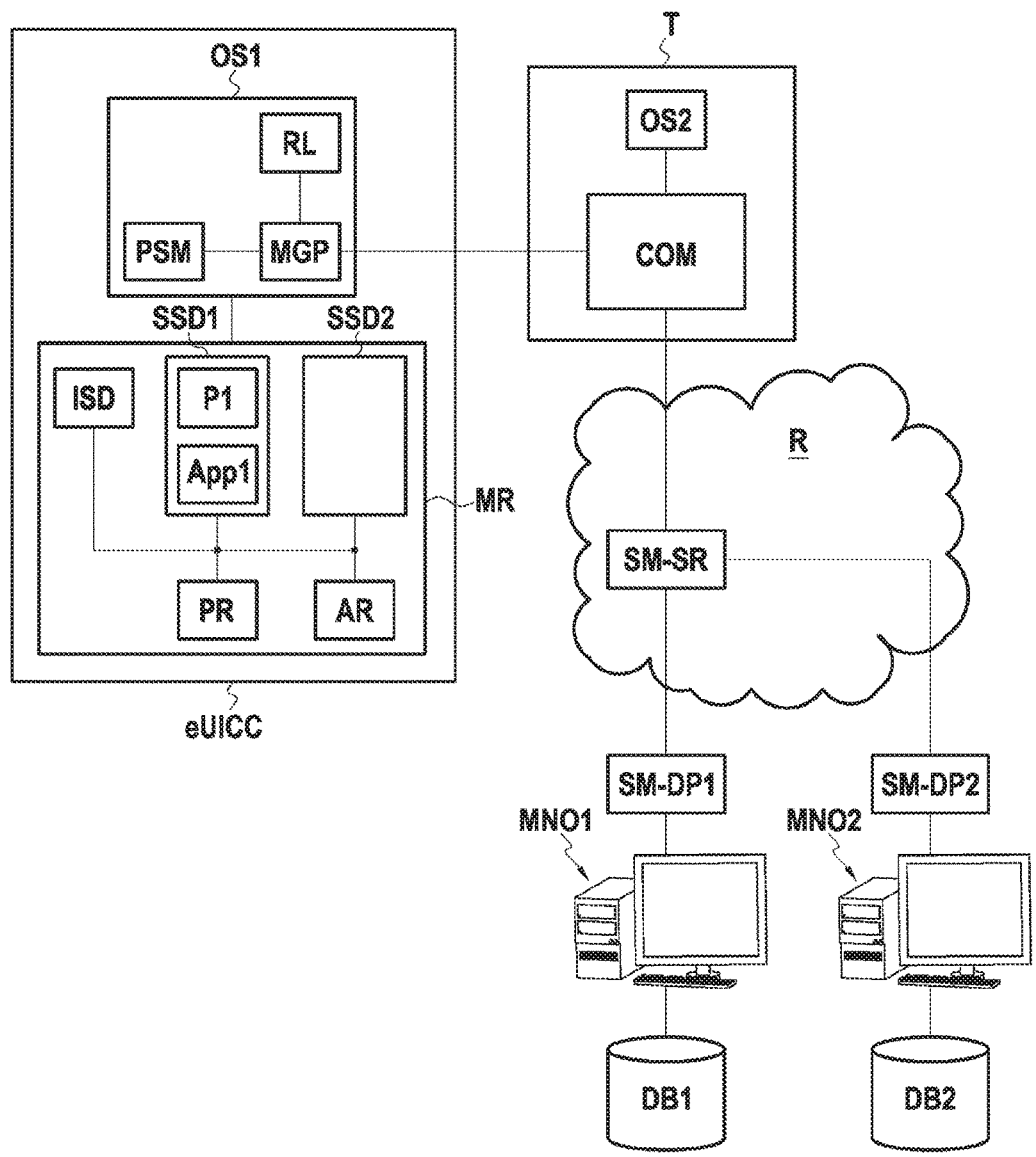
FIG. 1 is a diagram showing the architecture of an eUICC card in accordance with a particular embodiment of the invention, the eUICC card being suitable for co-operating with a mobile terminal in order to provide access to a mobile telephone network.

FIG. 1 is a diagram showing the architecture of an eUICC card in accordance with a particular embodiment of the invention, the eUICC card being suitable for co-operating with a mobile telephone terminal T in order to enable it to access a mobile telephone network R. By way of example, the eUICC card is soldered or integrated in the terminal T.

Although the embodiments of the invention described in this document relate to a mobile telephone terminal, the invention applies more generally to any communication device suitable for co-operating with a trusted component such as an eUICC card. By way of example, the communication device T may be a communicating intelligent object as explained above that is capable of communicating via a telecommunications network with another machine (e.g. an energy consumption meter of a building suitable for communicating with a distributor via a telecommunications network).

In the presently-described embodiment, the mobile terminal T may use the eUICC card to access in secure manner the network R and the services provided by the associated mobile network operator MNO1 or MNO2.

In this particular embodiment, the mobile terminal T has an operating system OS2 suitable in particular for controlling a communications interface COM. By way of example, this interface COM comprises a transceiver coupled to an antenna, in conventional manner.

In the presently-described embodiment, the eUICC card is a trusted component including in particular an operating system OS1 (stored in a ROM, for example) coupled to a rewritable non-volatile memory MR.

The operating system OS1 includes a software module PSM and a profile manager module that are described in more detail below.

Furthermore, the non-volatile memory MR includes a privileged issuer security domain (ISD) and secondary security domains (SSD1 and SSD2 in this example). Each security domain (or secure domain) constitutes a secure compartment of the eUICC card.

The security domain ISD is privileged in that, in known manner, it is suitable in particular for creating and deleting secondary security domains in the non-volatile memory MR, in co-operation with the profile manager module MGP.

Furthermore, each secondary security domain SSD may include a communication profile (or operational profile) associated with a particular network operator MNO. In known manner, a communication profile may include in particular subscription data (e.g. identifiers (IMSI, etc.), cryptographic keys, algorithms (e.g. for authentication), . . . ). In the eUICC card, an operator MNO can access only the secondary security domain SSD that is specific thereto.

In the presently-described embodiment, each communication profile is contained in a dedicated security domain.

In the presently-described embodiment, the secondary security domain SSD1 has a communication profile P1 that, when active, enables the terminal T to communicate over a first mobile network associated with the network operator MNO1. The domain SSD1 also has applications APP1 to which the user has subscribed and that are specific to the operator MNO1. Alternatively, the applications APP1 defined for the profile P1 may be contained in the profile P1 itself.

In this example, the secondary security domain SSD2 is empty, but it is likewise capable of containing a communication profile P2 that, if active, enables the terminal T to communicate with the mobile network of the operator MNO2, together with applications APP2.

Furthermore, the profile manager module MGP is suitable for acting via the terminal T (and in particular its interface COM) to communicate in secure manner with a remote subscriber manager secure routing (SM-SR) entity of the network R in order to carry out predefined actions in association with a communication profile (e.g. P1).

As mentioned below, the actions that can be performed are various and in particular they may include installing, activating, or deactivating a communication profile in a secondary security domain SSD1 or SSD2.

The module PSM is suitable for receiving from the remote server SM-SR communication profile management requests that it transmits to the profile manager module MGP. The module MGP is configured to manage one or more (existing or future) communication profiles in the eUICC card on the basis of a rule set RL having at least one rule and contained in the memory of the eUICC card. For this purpose, the module MGP is suitable for consulting the rules RL in order to determine which rule(s) is/are applicable in response to a communication profile management request received from the server SM-SR. The module MGP is capable of appropriately processing the request RQ1 it has received by executing one or more actions as specified by the applicable rules in the rule set RL.

By way of example, the rules RL may be defined by the user of the eUICC card.

Where appropriate, the modules PSM and MGP can correspond to a single software module implemented by the eUICC card.

The module MGP is also capable of communicating with a communication profiles, register PR and with an applications register AR, these registers both being contained in the non-volatile memory MR in this example.

In this embodiment, the communication profiles register PR serves to organize the communication profiles and their associated applications. By way of example, the register PR is in the form of a database and may comprise at least two of the following elements in association, for example:

a profile identifier ICC_ID;

a status indicating whether the communication profile is or is not active;

a pointer to the memory address of the communication profile under consideration;

at least one memory address pointing to one or more applications referenced in the applications register AR;

an address for the server SM-DP of the associated operator MNO; and access rights to particular services, . . . .

Once created or installed in a secondary security domain SSD, each communication profile is referenced in the profiles register PR. The profiles register PR acts in particular to create memory addresses AD in the applications register AR so that the applications needed for managing the associated profile can be invoked easily by the profile manager module MGP, when necessary.

In a particular embodiment, the profile manager module is configured to consult the communication profiles register in order to obtain at least one additional data item enabling the action(s) specified by the applicable rules in the set RL to be performed.

Furthermore, the server SM-SR may be specific to each mobile operator MNO or it may be shared by a plurality of operators MNO (as shown in FIG. 1). In known manner, the server SM-SR is used to manage the eUICC cards of mobile terminal users, and in particular to provide subscription information necessary for enabling users to access the services to which they have subscribed.

Each operator MNO1 and MNO2 is capable of communicating with a respective server SM-DP (i.e. SM-DP1 and SM-DP2). In known manner, these servers SM-DP are configured to group together and encrypt the information that the MNOs seek to deliver to the eUICC card of the user via the server SM-SR. In general, this information is encrypted so that the server SM-SR cannot interpret it. Furthermore, in this example, each of the operators MNO1 and MNO2 has access to a respective database (DB1 or DB2), each containing subscription information, in particular.

The operating system OS1, and more particularly the software module MGP, constitutes an example of a computer program in the meaning of the invention, this program including instructions for executing steps of a communication profile management method in a particular implementation of the invention.

The memory in which the operating system OS2 is contained thus constitutes an example of a data medium in the meaning of the invention that is readable by a processor (not shown) of the eUICC card.

A particular implementation of the invention performed by the eUICC card of FIG. 1 is described below with reference to FIG. 2. More precisely, the eUICC card performs the profile management method of the invention by making use in particular of the profile manager module MGP.

Consideration is given below to the situation in which the server SM-SR acts in a step E2 to transmit a communication profile management request RQ1 to the eUICC card. In the presently-envisaged situation, the request RQ1 is a request to deactivate the communication profile P1, but this constitutes no more than a non-limiting example of a management request that can be processed by the module MGP.

In this example, the management request RQ1 is received by the privileged security domain ISD and then transmitted to the software module PSM (step E4). Alternatively, the request RQ1 may be received directly by the module PSM. The module PSM constitutes an example of a reception module in the meaning of the invention (or a portion of that module).

The module PSM verifies the request RQ1, and if it is valid, transmits the request to the profile manager module MGP (step E6).

During a step E8, the module MGP determines whether at least one rule of the step RL is applicable in response to the management request RQ1. If no rule of the step RL is applicable, the management method comes to an end (step E10). Otherwise, the module MGP executes at action specified by the applicable rule(s) referenced RL-A, with this action being associated with an existing or future communication profile of the eUICC card. By way of example, the specified action may relate to the profile P1 or possibly to a profile P2 that is to be created in the domain SSD2.

In the presently-described implementation, the module MGP executes two actions specified by the applicable rule RL-A in response to the request RQ1 to deactivate the profile P1, i.e. actions E15 and E21 both relating to managing the communication profile P1. Other examples of management requests and of corresponding actions can naturally be envisaged, as explained below.

Figure 2:
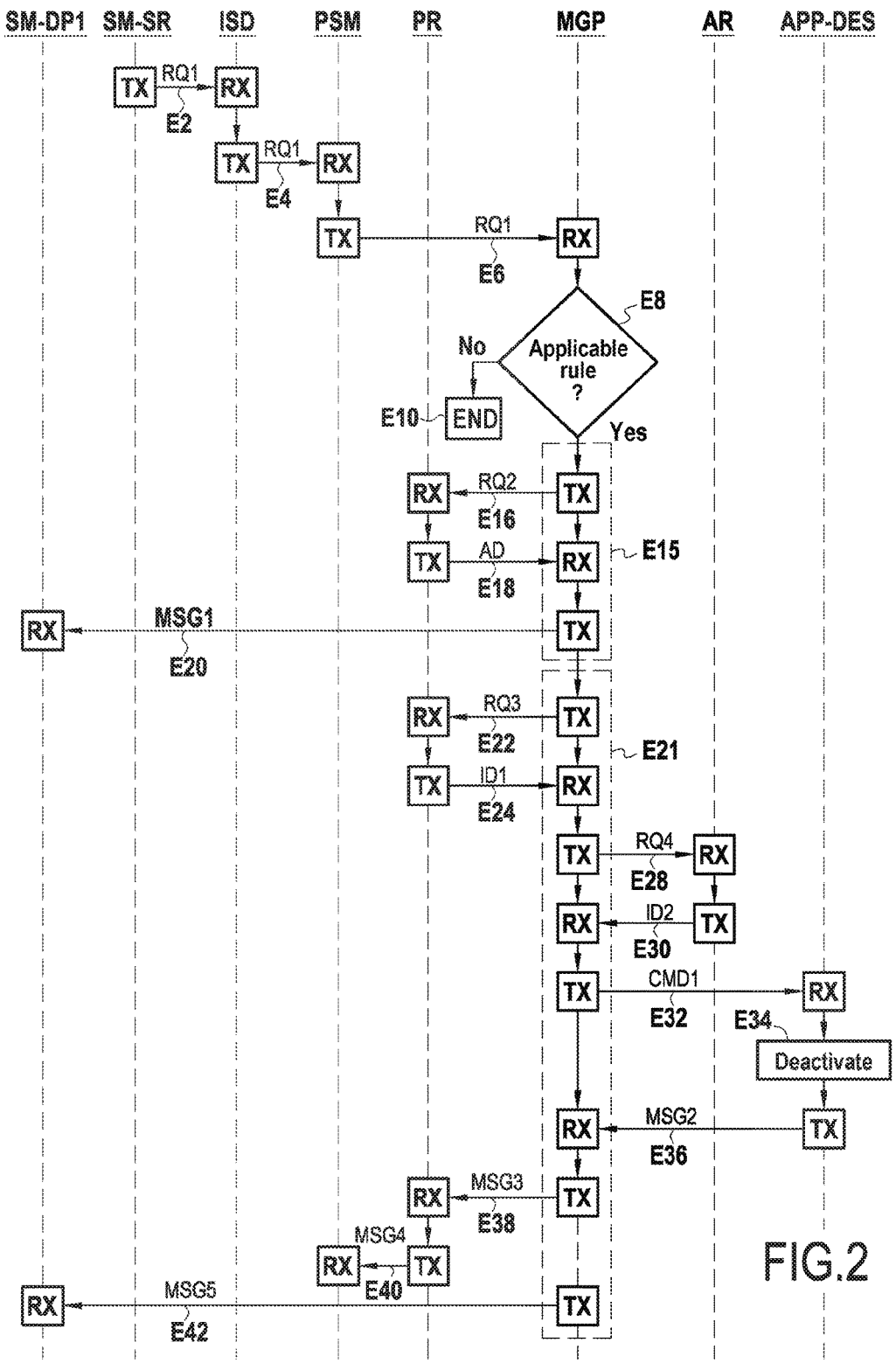
FIG. 2 is in the form of a flow chart showing the main steps of a method of managing a communication profile as performed by the eUICC card in accordance with a particular implementation of the invention.

More specifically, the module MGP begins by informing a server of the operator MNO1 concerned, e.g. the server SM-DP1 as shown in FIG. 2 that the presently-active profile P1 is about to be deactivated (step E15). To do this, in this example the module MGP begins by sending (E16) a request RQ2 to the profiles register PR. In responses, the module MGP receives (E18) the address AD of the server SM-DP associated with the profile to which the current treatment applies (i.e., in this example, the address of the server SM-DP1 associated with P1). By consulting the profiles register PR, the mobile MGP is capable of verifying that the profile P1 is indeed referred in said profiles register PR.

Thereafter, the mobile MGP sends (E20) a message MSG1 to the server SM-DP1 in order to inform it that the profile P1 is about to be deactivated.

This message MSG1 is a deactivation notification sent to the remote server SM-DP1, e.g. by using a message of the short message service (SMS) type or of the unstructured supplementary service data (USSD) type, or by using a message based on the hypertext transfer, card application toolkit transfer protocol (HTTPs/CAT TP) or on the bearer independent protocol (BIP). Notifications relating to other events can naturally be sent on command of the mobile MGP using the above-specified technologies.

Informing the server SM-DP1 in advance of the imminent deactivation of the profile P1 (or of any other imminent event associated with the profile P1) is advantageous in that it makes it possible in particular for the corresponding operator MNO1 to trigger any necessary management operation relating to the profile P1 (e.g. such as causing critical information contained in the profile P1 such as cryptographic keys, algorithms, etc. to be deleted), where necessary prior to actual deactivation of the profile P1.

As explained below with reference to FIG. 3, it is possible to envisage other ways of enabling the module MGP to warn the server SM-DP1 of the imminent deactivation of the profile P1.

Still with reference to FIG. 2, the profile manager module MGP also acts during a step E21 to trigger deactivation of the profile P1 in compliance with the management request RQ1. To do this, the module MGP sends (E22) a request RQ3 to the profiles register PR. In return, the module MGP receives (E24) from the profiles register PR, an identifier ID1 of an application APP-DES that is to be run, namely the application for deactivating the profile P1.

Thereafter, the module MGP sends (E28) a request RQ2 containing the identifier ID1 to the applications register AR. In response, the module MGP receives (E30) from the applications register AR data ID2 enabling execution of the deactivation application APP-DES to be triggered. By way of example, this data ID2 may comprise a memory address and/or any other appropriate parameters.

Thus, during a step E32, the profile manager module MGP sends (E32) a command CMD1 to the deactivation application. APP-DES commanding it to deactivate the communication profile P1 in the eUICC card. For this purpose, the command CMD1 may include an identifier of the profile P1 that is to be deactivated.

Once the profile P1 has been deactivated (E34), the profile manager module MGP receives (E36) from the application APP-DES a notification MSG2 indicating that deactivation of the profile P1 has been performed.

In this implementation, the module MGP then uses a notification MSG3 to inform (E38) the profiles register PR that the profile P1 has been deactivated. In this way, the profiles register PR can update the active/inactive status of the profile P1 in question, for example.

Still in this example, the profiles register also sends (E40) a message MSG4 to the software module PSM in order to inform it that the profile P1 has been deactivated.

Optionally, the module MGP may also send (E42) a message MSG5 to the remote server SM-DP1 in order to inform it that the profile P1 is now inactive. To do this, it is possible to use the same technologies as those mentioned above for the message MSG1.

Figure 3:
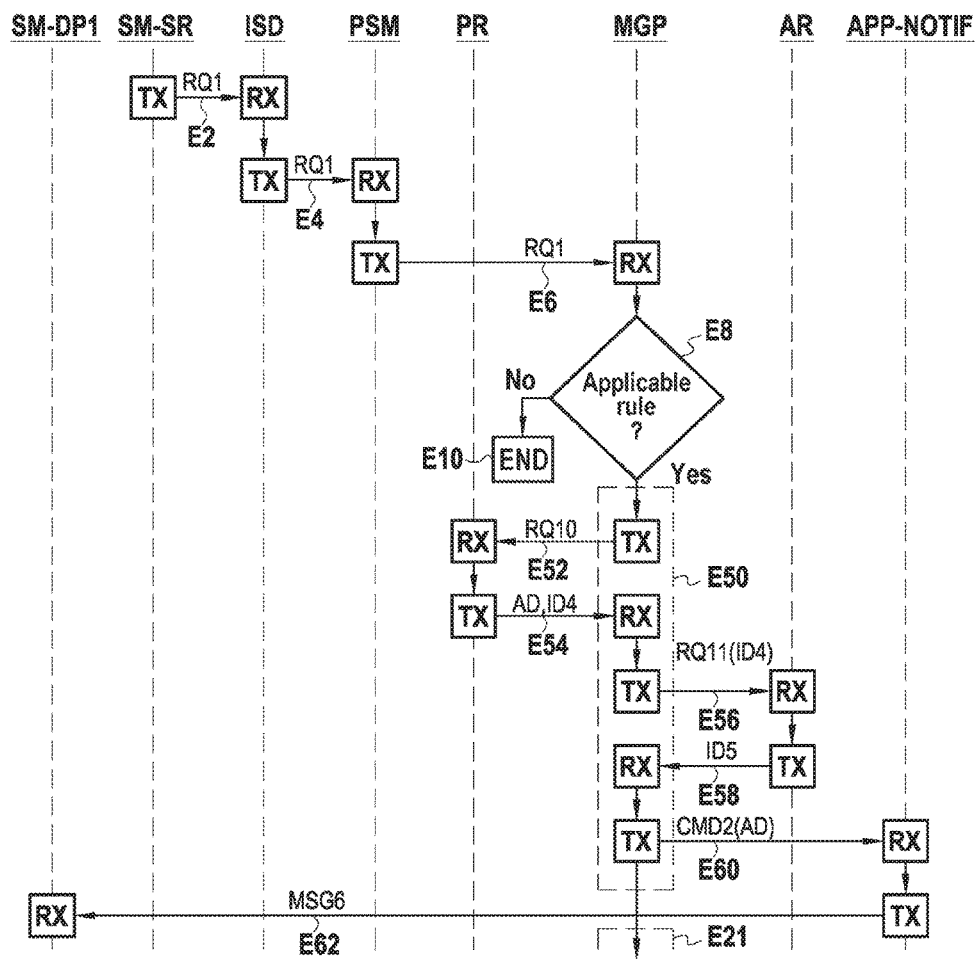
FIG. 3 is in the form of a flow chart showing the main steps of a method of managing a communication profile in accordance with a variant of the FIG. 2 implementation.
Figure 3:
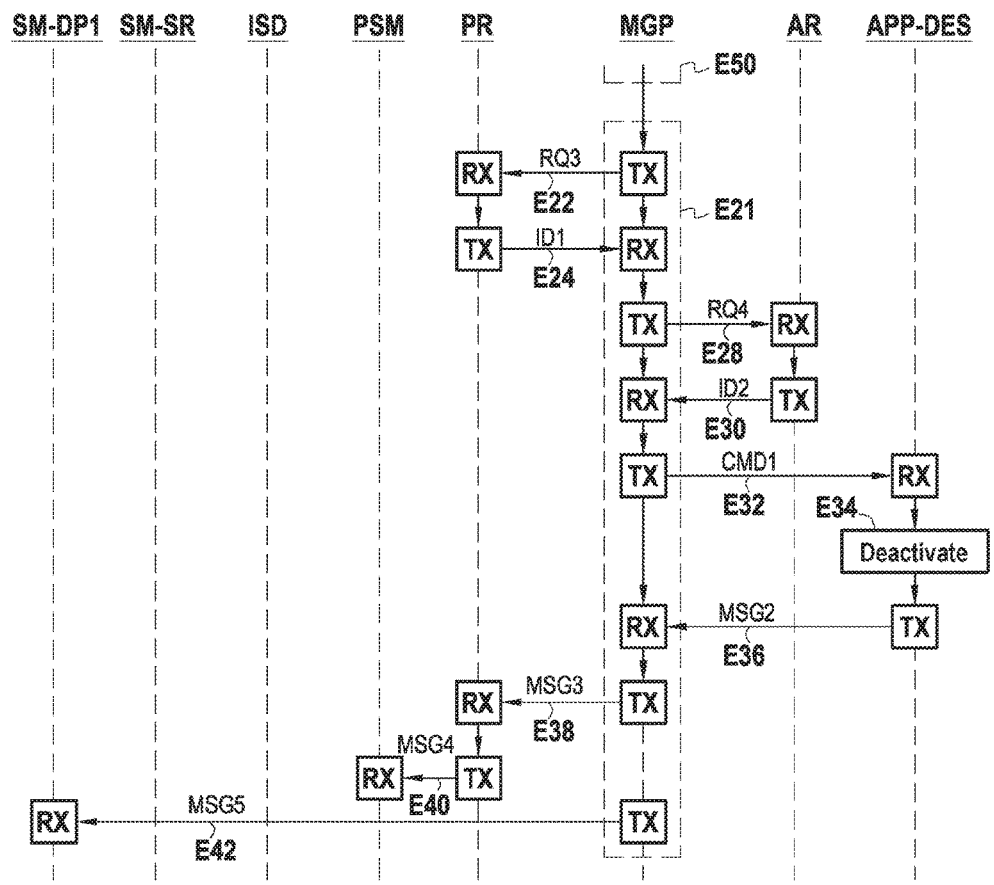

FIG. 3 shows a variant of the implementation described with reference to FIG. 2. In FIG. 3, the steps E2 to E10 are performed in the same manner as in FIG. 2. In contrast, in the event of a positive result for the determination step E8, the module MGP performs a step E50 instead of the above-described step E15. In other words, the action performed in step E50 in compliance with the applicable rule is different from the action E15 described above with reference to FIG. 2.

In substance, during this step E50, the module MGP sends (E52) a request RQ10 to the profiles register PR. In return, the module MGP receives (E54), from the profiles register PR, the address AD of the remote server SM-DP1 together with the identifier ID4 of a notification application APP-NOTIF that is to be invoked in order to warn the remote server SM-DPI of the imminent deactivation of the profile P1.

The module MGP thus sends (E56) a request RQ11 containing the identifier ID4 to the applications request AR. In return, the module MGP receives from said request AR data ID5 enabling the module MGP to trigger execution of the notification application APP-MOTIF. By way of example, this data ID4 may comprise a memory address.

The module MGP then sends (E60) to the application APP-NOTIF, a command CMD2 containing the address AD of the remote server DM-DP1 in order to cause the application APP-NOTIF to send (E62) a notification. MSG6 to inform the server SM-DP1 (and consequently the operator MNO1) that the communication profile P1 is about to be deactivated. By way of example, the message MSG6 may be sent using the same technologies as those mentioned above for sending the message MSG1.

As mentioned with reference to FIG. 2, it is not essential for the server shown under the reference SM-SP1 in FIG. 3 to be of the type SM-DP1.

Thereafter, the module MGP performs the step E21 as described above with reference to FIG. 2.

The present variant thus differs from the implementation described in FIG. 2 in that in this example the module MGP calls on an appropriate notification application APP-NOTIF in order to inform the server SM-DP1 of the imminent deactivation of the profile P1. Under such circumstances, the module MGP is suitable for causing a notification to be sent to the appropriate remote server SM-DP by using the address received from the profiles register PR.

Numerous variants of the implementations shown in FIGS. 2 and 3 may naturally be envisaged. In particular, the notifications MSG1 and MSG6 sent respectively in steps E20 and E62 may also trigger various functions depending on the desired configuration. In a particular variant, the applicable rule RL-A may specify that each of the messages E20 and E62 includes a parameter (e.g. of the MSISND type) that serves, on being received by the operator MNO in question, to trigger a call forwarding mechanism with the operator. In practice, such a call forwarding function seeks to enable a user to be contacted on a first telephone number associated with a first communication profile even when the profile is deactivated. More precisely, when the rule RL-A that is applied causes the call forwarding function to be performed, the eUICC card (and more particularly its profile manager module MGP) sends a message to the operator MNO associated with the profile that is about to be deactivated (MNO1 in this example). This message informs the MNO that calls to a first telephone number associated with the profile that is to be deactivated are to be redirected to a second telephone number associated with another operator. On receiving a call for the first telephone number, the operator associated with the profile that is to be deactivated thus transfers the call to the network of the other operator involved.

As explained above, the profile manager module of the invention is not limited to processing profile deactivation requests. The profile manager module is suitable more generally for performing at least one predefined action in association with a communication profile (already existing or to come in the eUICC card), with this action being specified by an applicable rule from a set RL comprising at least one rule. The predefined action that is to be performed may seek for example to activate or deactivate a profile, to switch over (permanently or temporarily) from a first profile to a second profile, to delete a profile, or to delete some or all of the data associated with the profile, or indeed to notify a server of a particular event (such as at least one of the above-specified actions).

There follow examples of rules defining particular actions when particular conditions are satisfied:

if using the presently-active communication profile P presents a cost (e.g. in terms of quality of service) exceeding a certain limit in the geographical region in which the terminal T is to be found, →then a changeover to a more appropriate communication profile is triggered;

if the presently-active communication profile does not comply with a certain quality of service, →then changeover to a more appropriate profile is triggered;

deactivation requests coming from a particular server SM-DP are authorized or not authorized;

if a deactivation request is received from a position server SM-DP, →then a message is sent with specific data USSD.

if a deactivation request is received from a particular server SM-DP, →then all of the data, applications, and/or files associated with the profile that is about to be deactivated are deleted;

if a profile changeover request is received from a particular server SM-DP, →then a file management operation is performed (e.g. deleting sensitive data such as cryptographic keys of particular files);

if a profile changeover request is received from particular server SM-DP, →then the applications associated with the deactivated network are themselves deactivated;

if a profile changeover request is received from a particular server SM-DP, →then a waiting time delay is started between changing over from the first profile to the second profile in order to allow additional functions to be executed (e.g. deleting certain data, sending a message, updating the applications request AR, . . . );

etc.

In a particular implementation, said at least one action specified by the applicable rule to be performed by the module MGP comprises at least one of the following:

triggering a changeover from the active communication profile to a determined second communication network (distinct from the presently-active profile);

triggering deactivation of the active communication profile;

triggering activation of a second communication profile (distinct from the presently-active profile);

deleting some or all of the data of the active communication profile (which data is in a non-volatile memory of the subscriber identity module);

triggering deactivation of at least one function of the active communication profile, said at least one function comprising at least one function selected from a contactless payment application and a transport ticket application;

triggering a timer in order to start a determined waiting time delay between receiving said request to manage said profile and performing at least part of said at least one action; and notifying a remote server of the performance of an action, e.g. an action of loading, activating, deactivating, or deleting a communication profile or some or all of the data of a communication profile.

In general manner, the present invention thus makes it possible to optimize the management of communication profiles in a trusted component such as an embedded subscriber identity module from a set comprising at least one rule that might be applicable by the profile manager module. The present invention provides great flexibility in managing profiles as a function of events detected by the trusted component such as, in particular, requests received from mobile network operators.

The person skilled in the art will understand that the implementations and variants described above are no more than non-limiting examples of how the invention can be performed. In particular, the person skilled in the art may envisage any combination of the variants and implementations described above in order to satisfy some particular need.

The invention claimed is:

1. An embedded subscriber identity module suitable for co-operating with a communication device, the embedded subscriber identity module comprising:
   at least one communication profile configured to enable the embedded subscriber identity module to communicate via the communication device with a mobile telephone network when said at least one communication profile is active;
   a reception module suitable for receiving, from a remote server of said mobile telephone network, a communication profile management request related to a first communication profile; and
   a profile manager module configured:
      on receiving said management request, to determine whether at least one rule from a predefined set of at least one rule contained in memory in said embedded subscriber identity module is applicable; and
      if so, to execute at least one action specified by said applicable rule in association with the first communication profile for said embedded subscriber identity module;
   wherein the at least one action includes an action that sends a notification to a remote server that is associated with the first communication profile before executing an action that affects the first communication profile; and
   wherein the notification informs the remote server in advance of the action that affects the first communication profile.

2. The embedded subscriber identity module according to claim 1, wherein each of the at least one communication profile is contained in a dedicated secure domain of said embedded subscriber identity module.

3. The embedded subscriber identity module according to claim 1, wherein said at least one action specified by said applicable rule comprises at least one of the following:
   triggering a changeover from said active communication profile to a determined second communication profile;
   triggering deactivation of said active communication profile;
   triggering activation of a second communication profile;
   deleting some or all of the data of said active communication profile, said data being stored in a non-volatile memory of said subscriber identity module;
   triggering deactivation of at least one function of said active communication profile;
   triggering a timer in order to impose a determined waiting time delay between receiving said management request and performing at least part of said at least one action.

4. The embedded subscriber identity module according to claim 3, wherein said at least one function comprises at least one of a contactless payment application and a transport ticket application.

5. The embedded subscriber identity module according to claim 1, wherein the profile manager module is configured to consult a database of communication profiles, said database being stored in a rewritable non-volatile memory of said embedded subscriber identity module, in order to obtain at least one item of additional data enabling said at least one action to be performed.

6. The embedded subscriber identity module according to claim 5, wherein said database of communication profiles comprises, in association with each communication profile, at least one of the following:
- an identifier of said communication profile;
- a status indicating whether said communication profile is active or not active;
- a pointer to the memory address of said communication profile; and
- an address of the server of the provider of said communication profile.

7. The embedded subscriber identity module according to claim 5, wherein said management request requests deactivating the active communication profile, and wherein the profile manager module is configured:
- to determine, from said database of communications profiles, an address of the remote server of a telephone network associated with the active communication profile;
- wherein the action that sends the notification to a remote server uses said address in order to inform the remote server of a forthcoming loading, activation, deactivation, or deletion of a communication profile or of some or all of the data of a communication profile.

8. The embedded subscriber identity module according to claim 7, wherein the profile manager module is configured to use the database of communications profiles to determine a notification application;
- said profile manager module being configured to send a command containing said address to the notification application in order to cause said notification application to send the notification to said remote server.

9. The embedded subscriber identity module according to claim 7, wherein the notification is sent to said remote server by using a message of the short message service type or of the unstructured supplementary service data type, or by using a message based on the hypertext transfer, card application toolkit transfer protocol or on the bearer independent protocol.

10. The embedded subscriber identity module according to claim 1, wherein the remote server is a subscriber manager secure routing (SM-SR) server of said mobile telephone network.

11. The embedded subscriber identity module according to claim 1, wherein the communication device is a mobile telephone terminal.

12. A system comprising a communication device and an embedded subscriber identity module in accordance with claim 1, wherein the embedded subscriber identity module is suitable for co-operating with said communication device to communicate with said mobile telephone network, the communication device being a mobile telephone terminal.

13. A method of managing a communication profile, the method being performed by an embedded subscriber identity module suitable for co-operating with a communication device, the method comprising:
- using a communication profile contained in the embedded subscriber identity module to communicate via the communication device with a mobile telephone network when said communication profile is active;
- receiving a communication profile management request related to the communication profile from a remote server of said mobile telephone network;
- on receiving said management request, using a profile manager module to determine whether at least one rule from a predefined set of at least one rule contained in memory in said embedded subscriber identity module is applicable; and
- upon determining that at least one rule from the predefined set of at least one rule contained in memory in said embedded subscriber identity module is applicable, using the profile manager module to execute at least one action specified by said applicable rule in association with the communication profile for said embedded subscriber identity module;
- wherein the at least one action includes an action that sends a notification to a remote server that is associated with the communication profile before executing an action that affects the communication profile; and
- wherein the notification informs the remote server in advance of the action that affects the communication profile.

14. The management method according to claim 13, wherein the communication profile is contained in a dedicated secure domain of said embedded subscriber identity module.

15. A non-transitory processor-readable data medium storing a computer program including instructions, the when executed by a processor, perform steps of the method according to claim 13.

* * * * *